(12) United States Patent  
Skinner et al.

(10) Patent No.: US 7,474,517 B2
(45) Date of Patent: Jan. 6, 2009

(54) MODULARLY EXPANDABLE DATA STORAGE DEVICE RECEPTACLE

(75) Inventors: David N. Skinner, Redwood Shores, CA (US); Mike McCullough, San Jose, CA (US); Yancy Chen, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 454 days.

(21) Appl. No.: 11/261,257

(22) Filed: Oct. 28, 2005

(65) Prior Publication Data

US 2007/0097612 A1    May 3, 2007

(51) Int. Cl.
*H02H 7/00* (2006.01)
(52) U.S. Cl. ..................................... 361/108
(58) Field of Classification Search .................. 361/108
See application file for complete search history.

(56) References Cited

U.S. PATENT DOCUMENTS

| 5,913,926 | A | 6/1999 | Anderson et al. |
| 6,327,168 | B1 | 12/2001 | Campbell |
| 6,661,648 | B2 * | 12/2003 | Dayley ...................... 361/683 |
| 2003/0007321 | A1 | 1/2003 | Dayley |

* cited by examiner

*Primary Examiner*—Stephen W Jackson

(57) ABSTRACT

A modularly expandable data storage device receptacle includes a housing configured to receive a memory device for providing additional data storage for a computer system, in which the housing is external to the computer system. A first connector is provided for receiving data signals from the computer system for accessing the memory device. A second connector is provided for passing data signals from the computer system to a connector of another modularly expandable data storage device receptacle.

20 Claims, 7 Drawing Sheets

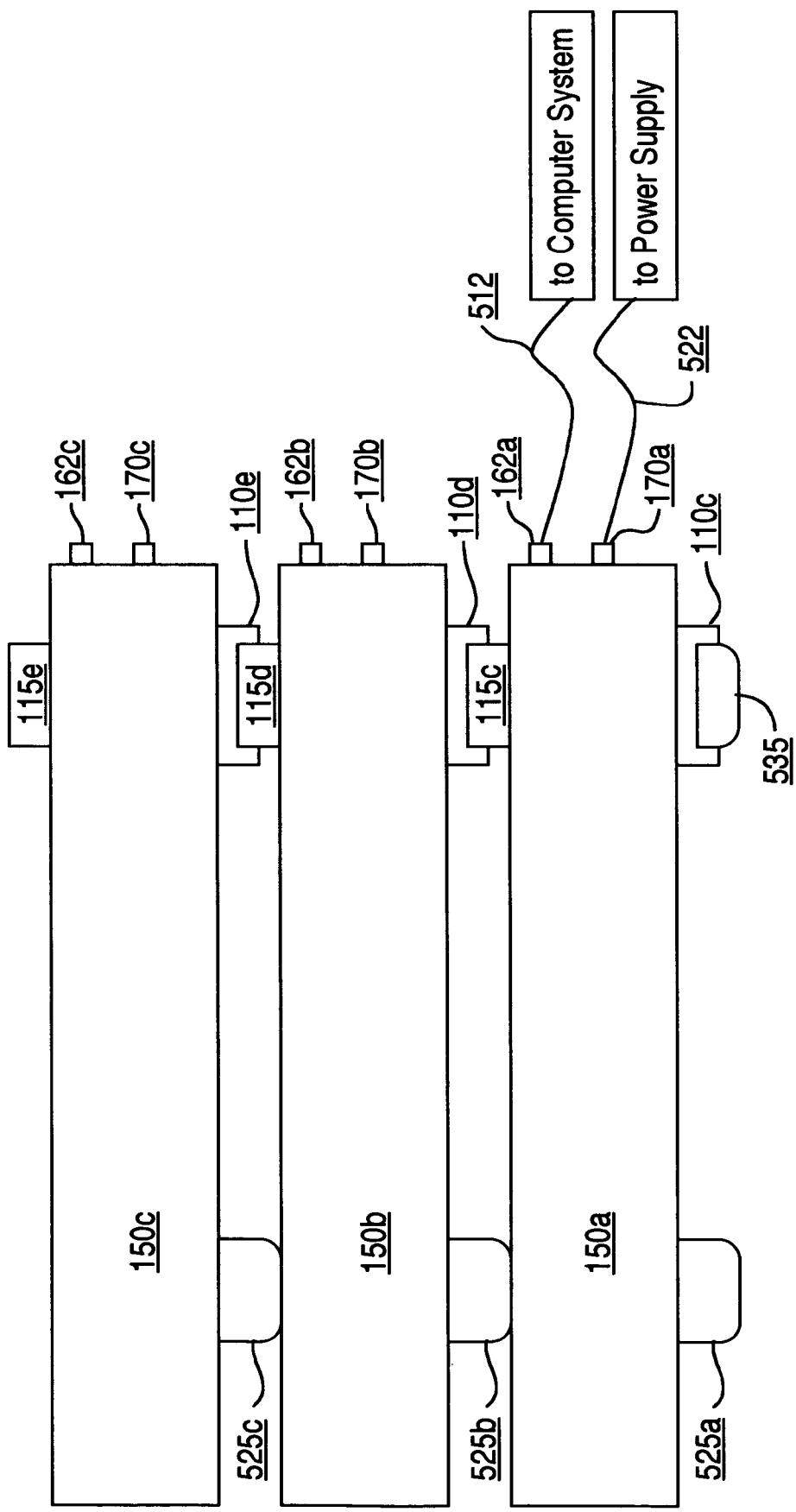

600

---

Receive a communication associated with a memory device of a first modularly expandable data storage device receptacle, the communication initiated at a computer system, wherein the first modularly expandable data storage device receptacle is communicatively coupled to the computer system through a second modularly expandable data storage device receptacle, wherein a throughput connector of the second modularly expandable data storage device receptacle is communicatively coupled to an input/output connector of the first modularly expandable data storage device receptacle
610

↓

Responsive to the communication, transmit a second communication to the computer system, the second communication passing through the second modularly expandable data storage device receptacle
620

↓

Receive a power signal from a power supply, wherein the first modularly expandable data storage device receptacle is electrically coupled to the power supply through the second modularly expandable data storage device receptacle
630

↓

Receive a second communication associated with a third modularly expandable data storage device receptacle, the second communication initiated at a computer system, wherein the first modularly expandable data storage device receptacle is communicatively coupled to the third modularly expandable data storage device receptacle such that the third modularly expandable data storage device receptacle is communicatively coupled to the computer system through the first modularly expandable data storage device receptacle and the second modularly expandable data storage device receptacle
640

↓

Throughput the second communication to the third modularly expandable data storage device receptacle
650

Figure 6

MODULARLY EXPANDABLE DATA STORAGE DEVICE RECEPTACLE

BACKGROUND ART

Data storage devices, such as hard disk drives, are used for storing data that is accessed by a computer system. Computer systems, such as desktop computer systems, are typically manufactured with a specific storage capacity defined by the size of installed hard disk drives. Many current and proposed uses of computer systems, such as the storage of media files (e.g., audio files and video files), can quickly use all installed storage capacity. In order to supplement the storage capacity, additional hard disk drives are typically added to the computer system.

Currently, increasing storage capacity for a desktop computer system involves either installing an additional internal hard disk drive or purchasing and connecting an external hard disk drive. Installing an internal hard disk drive is a complicated task that requires a user to access the internal components of the computer system, which many users do not feel comfortable performing. Moreover, typical desktop computer systems have a limited number of drive bays for inserting additional internal hard disk drives. On the other hand, external hard disk drives are typically connecter through individual ports of the computer system, and are limited to the number of ports. Moreover, external hard disk drives require connection to a power supply. Thus, as the number of external hard disk drives increases, the number of computer ports and power supply connections increases, requiring additional cabling, and increasing the complexity of the system. Furthermore, external disk drives are separate units having many different form factors, each of which must be placed near the computer system, requiring substantial desk or shelf space.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 5 is a schematic diagram illustrating a plurality of modularly expandable data storage device receptacles coupled to a computer system through one of the modularly expandable data storage device receptacles, in accordance with an embodiment of the present invention.

FIG. 6 is a flow chart illustrating a process for accessing a modularly expandable data storage device, in accordance with an embodiment of the present invention.

The drawings referred to in this description should not be understood as being drawn to scale except if specifically noted.

DESCRIPTION OF THE EMBODIMENTS

Various embodiments of the present invention, a modularly expandable data storage device receptacle, are described herein. In one embodiment, a housing is configured to receive a memory device for providing additional data storage for a computer system, in which the housing is external to the computer system. A first connector is for receiving data signals from the computer system for accessing the memory device. A second connector is for passing data signals from the computer system to a connector of another modularly expandable data storage device receptacle.

Reference will now be made in detail to the various embodiments of the invention, examples of which are illustrated in the accompanying drawings. While the invention will be described in conjunction with the various embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the various embodiments of the present invention, numerous specific details are set forth in order to provide a thorough understanding of the present invention. In other instances, well known methods, procedures, components, and circuits have not been described in detail as not to unnecessarily obscure aspects of the embodiments of the present invention.

Various embodiments of the present invention, a modularly expandable data storage device receptacle, are described herein. Embodiments of the present invention provide an external receptacle for receiving a hard disk drive. The external receptacle is modularly expandable such that direct connections can be made to other external receptacles for passing data and power signals to multiple external receptacles through a single connection to a computer system. In one embodiment, multiple external receptacles are connected in series to the computer system. Additional external receptacles can added by connecting the additional external receptacles to an external receptacle connected to the computer system. The external receptacle includes a memory device connector for receiving a memory device, such as a hard disk drive, an input/output connector for receiving communications from the computer system, and a throughput connector for passing communications to other external receptacles. In particular, the input/output connectors and throughput connectors of adjacent external receptacles are configured for direct connection that does not require the use of cabling or any other connection means.

Figure 1A:
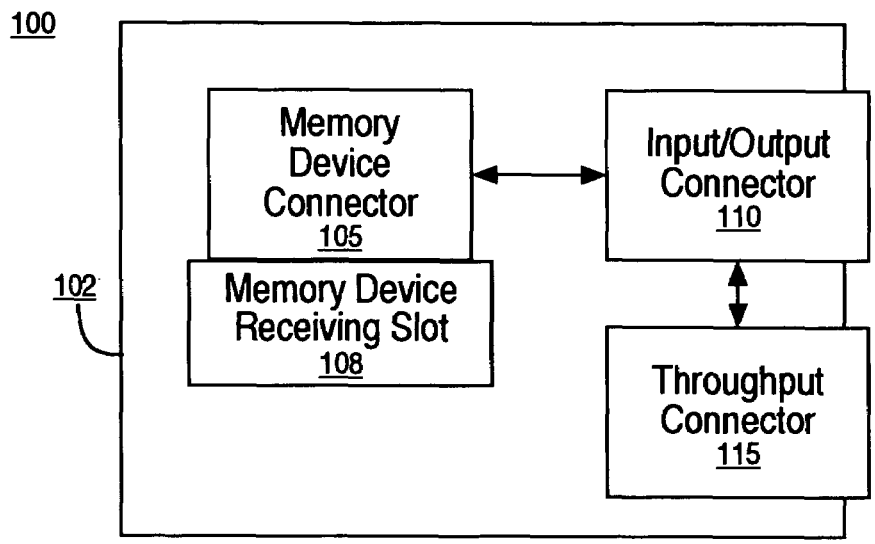
FIG. 1A is a block diagram illustrating components of a modularly expandable data storage device receptacle, in accordance with an embodiment of the present invention.

FIG. 1A is a block diagram illustrating components of a modularly expandable data storage device receptacle 100, in accordance with an embodiment of the present invention. Receptacle 100 includes a memory device connector 105, a memory device receiving slot 108, an input/output (I/O) connector 110, and a throughput connector 115, all included within housing 102. Receptacle 100 is configured to provide modular expansion of data storage capacity of a computer system. As described in detail below, multiple receptacles 100 can be connected in series to a computer system through a single connection through respective I/O connectors 110 and throughput connector 115. It should be appreciated that any number of receptacles 100 can be coupled in series to a computer system. In one embodiment, one receptacle 100 is coupled to a base station which is coupled to the computer system.

Memory device connector 105 is operable to provide data and power connections to a memory device (also referred to herein as a data storage device), such as a hard disk drive, that is placed within memory device receiving slot 108. It should be appreciated that memory device receiving slot 108 can be configured to receive any type and/or size of memory device. In one embodiment, memory device receiving slot 108 is configured to receive a standard 3.5-inch internal disk drive for use in a typical desktop computer. In another embodiment, memory device receiving slot 108 is configured to receive a standard 2.5-inch internal disk drive for use in a typical laptop computer. In other embodiments, disk drives having other non-standard and/or proprietary dimensions may be used. Moreover, in other embodiments memory device receiving slot 108 may be configured to receive solid state memory devices, such as flash memory devices, and the present invention is not limited to the use of hard disk drives.

Memory device connector 105 provides an electrical connection between a memory device placed within memory device receiving slot 108 and a communicatively coupled computer system. It should be appreciated that memory device connector 105 can be configured to connect to any type of memory device. In one embodiment, memory device connector 105 is configured for connection to an Advanced Technology Attachment (ATA) interface. In another embodiment, memory device connector 105 is configured for connection to a Small Computer System Interface (SCSI) interface. However, it should be appreciated that memory device connector 105 can be any type of connector for connecting to any type of memory device.

I/O connector 110 is configured for receiving data signals from a computer system for accessing the memory device. Throughput connector 115 is configured for passing signals between I/O connector 110 of external receptacle 100 and another throughput connector of another external receptacle that is coupled to I/O connector 110. In particular, I/O connector 110 is configured for direct connection to a throughput connector of another external receptacle. For example, I/O connector 110 and throughput connector 115 are configured as a male/female connector pair. It should be appreciated that I/O connector 110 and throughput connector 115 may be any type of connector for transmitting data.

In one embodiment, I/O connector 110 and throughput connector 115 each include a particular number of electrical connections, such as pins, for providing multiple paths for data transfer. In one embodiment, I/O connector 110 and throughput connector 115 also provide an electrical connection for providing power to a memory device within memory device receiving slot 108. For example, I/O connector 110 is configured for receiving a power signal. The power signal is transmitted to memory device connector 105 and is transmitted to throughput connector 115 for transmission to another external receptacle.

In one embodiment, I/O connector 110 is configured for connection to a base unit (e.g., base unit 210 of FIG. 3) for receiving data signals. The base unit is coupled to the computer system through a cable. It should be appreciated that the cable can connect to the computer system using any type of connection, such as a Universal Serial Bus (USB) connector or an IEEE-1394 (Firewire) connector. In one embodiment, the base unit is also configured for receiving a power signal from the computer system over the cable. In another embodiment, the base unit is coupled to a power supply through a power cable for providing power to a memory device.

Figure 1B:
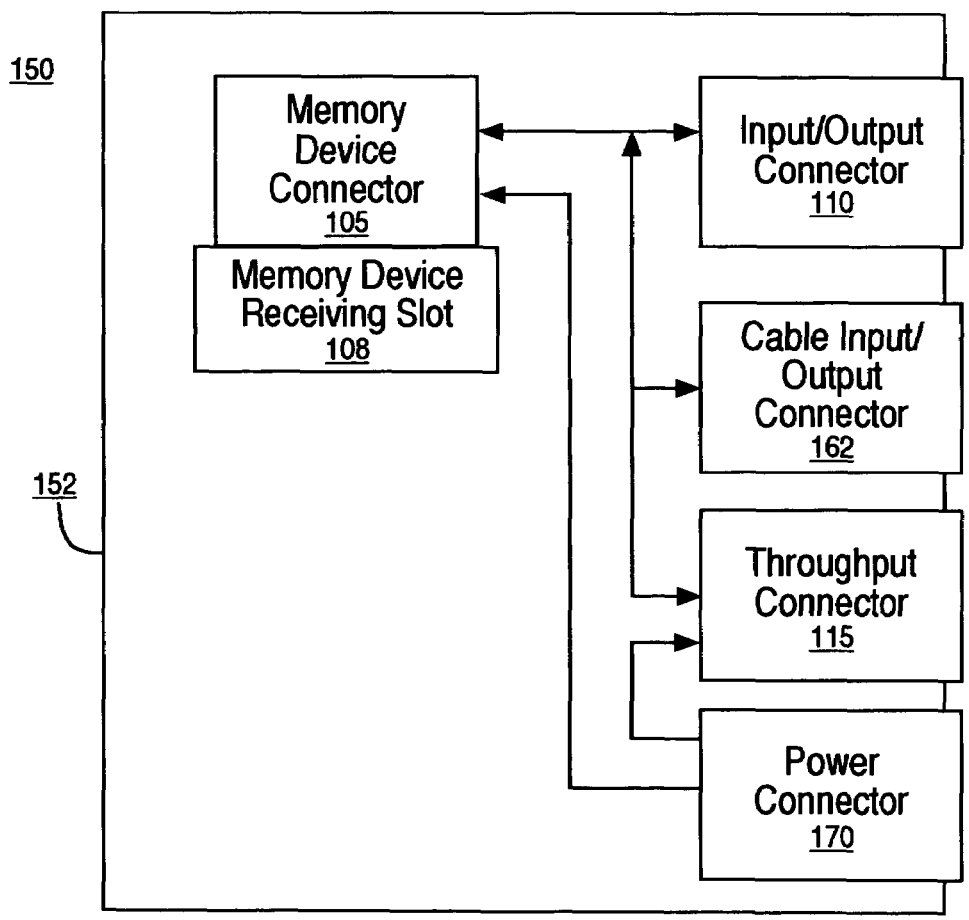
FIG. 1B is a block diagram illustrating components of a modularly expandable data storage device receptacle, in accordance with another embodiment of the present invention.

FIG. 1B is a block diagram illustrating components of a modularly expandable data storage device receptacle 150, in accordance with an embodiment of the present invention. Receptacle 150 includes a memory device connector 105, a memory device receiving slot 108, an I/O connector 110, a cable I/0 connector 162, and a throughput connector 115, all comprised within housing 152. In one embodiment, receptacle 150 also includes a power connector 170. Receptacle 150 is configured to provide modular expansion of data storage capacity of a computer system. As described in detail below, multiple receptacles 150 can be coupled in series to a computer system through a single connection through respective I/O connectors 110 and throughput connector 115, and without the use of a base unit.

It should be appreciated that the operation of device connector 105, memory device receiving slot 108, I/O connector 110, and throughput connector 115 of FIG. 1B are described above in reference to FIG. 1A which, for purposes of brevity and clarity, is not repeated. Cable I/O connector 162 operates in a similar manner as I/O connector 110, and is configured for receiving data signals from a computer system for accessing the memory device. However, cable I/O connector 162 is configured for providing a direct cable connection to the computer system. In one embodiment, only one of I/O connector 110 and cable I/O connector 162 is communicatively coupled to the computer system.

In one embodiment, cable I/O connector 162 receives a power signal from the computer system for providing power to a memory device within memory device receiving slot 108. In another embodiment, receptacle 150 also includes power connector 170 for providing a connection to a power supply, such as a power outlet, over a power cable. Power connector 170 is coupled to memory device connector 105 for providing power to a memory device within memory device receiving slot 108 and is also coupled to throughput connector 115 for providing power to another external receptacle coupled to throughput connector 115. It should be appreciated that the power supply can be any type of power source, such as an AC power outlet.

In summary, receptacle 100 of FIG. 1A and receptacle 150 of FIG. 1B provide for the modular expansion of data storage capacity of a computer system. Receptacles 100 and 150 are configured such that a throughput connector and an I/O connector of adjacent receptacles can be directly coupled without requiring external cabling. Additional receptacles, and hence additional memory devices, can be added to the computer system by coupling another external receptacle to an external receptacle that is coupled to the computer system. It should be appreciated that in order to couple to a computer system, receptacle 100 of FIG. 1A requires coupling to either a base unit that is coupled to a computer system or coupling to the throughput connector of a receptacle 150 of FIG. 1B, which can be directly coupled to the computer system. Accordingly, it should also be appreciated that in one embodiment, receptacle 100 and receptacle 150 are interchangeable and may be coupled.

Figure 2:
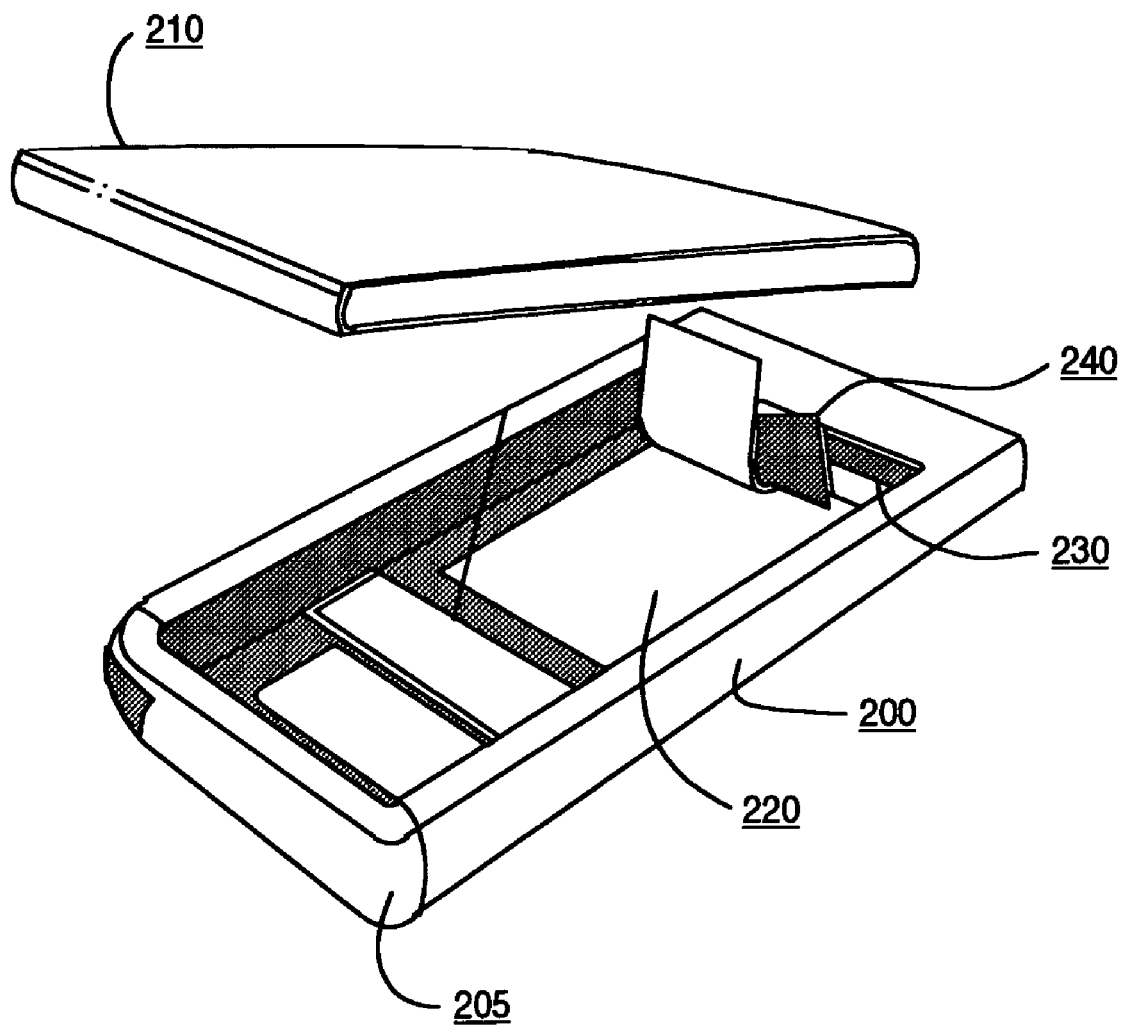
FIG. 2 is a perspective diagram of an exemplary modularly expandable data storage device receptacle, in accordance with an embodiment of the present invention.

FIG. 2 is a perspective diagram of an exemplary modularly expandable data storage device receptacle 200, in accordance with an embodiment of the present invention. Receptacle 200 includes housing 205 that includes memory device receiving slot 220 and memory device connector 230. Receptacle 200 is configured to receive memory device 210 (e.g., a hard disk drive) within memory device receiving slot 220 (e.g., memory device receiving slot 108 of FIG. 1A). Memory device 210 is electrically coupled to memory device connector 230 (e.g., memory device connector 105 of FIG. 1A) of receptacle 200. Arrow 240 indicates an exemplary motion of memory device 210 by a user in placing memory device 210 within housing 205 and connecting memory device 210 to memory device connector 230.

Figure 3:
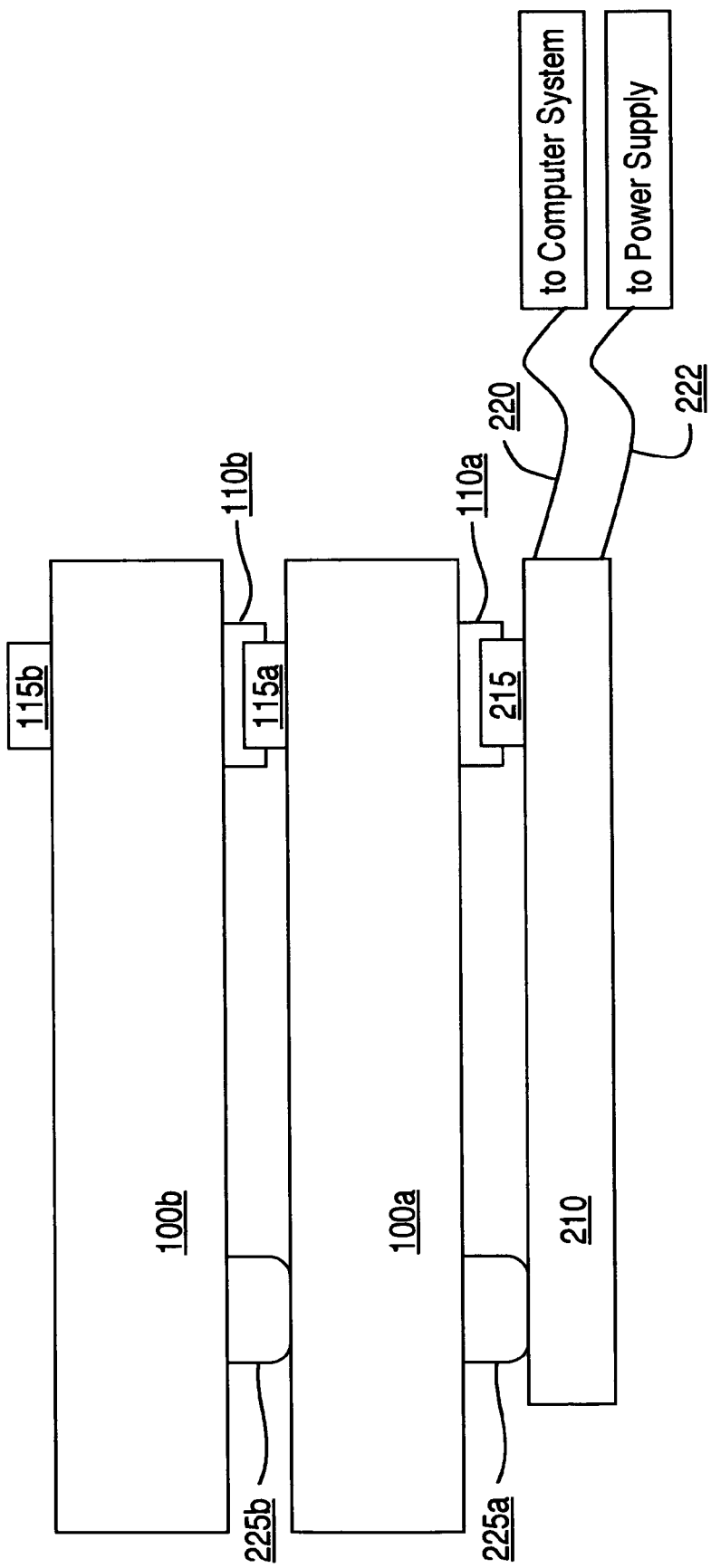
FIG. 3 is a schematic diagram illustrating a plurality of modularly expandable data storage device receptacles coupled to a computer system through a base unit, in accordance with an embodiment of the present invention.

FIG. 3 is a schematic diagram illustrating a plurality of modularly expandable data storage device receptacles 100a and 100b coupled to a computer system through a base unit 210, in accordance with an embodiment of the present invention. Base unit 210 is configured to provide an electrical connection between a computer system and receptacle 100a. Base unit 210 is coupled to a computer system over cable 220 and includes throughput connector 215. Receptacle 100a connects to base unit 210 such that I/O connector 110a is coupled to throughput connector 215. In one embodiment, receptacle 100a also includes appendage 225a for ensuring that receptacle 100a has a level connection with respect to base unit 215. In one embodiment, appendage 225a is an alignment feature that aligns with a groove on the surface of base unit 215 for ensuring that throughput connector 215 aligns properly with I/O connector 110a.

Receptacle 100a is configured for connection to receptacle 100b for providing receptacle 100b with coupling to the computer system. Receptacle 100b connects to receptacle 100a such that I/O connector 110b is coupled to throughput connector 115a. In one embodiment, receptacle 100b also includes appendage 225b for ensuring that receptacle 100b has a level connection with respect to receptacle 100a. In one embodiment, appendage 225b is an alignment feature that aligns with a groove on the surface of receptacle 100a for ensuring that throughput connector 115a aligns properly with I/O connector 110b. Receptacle 100b also includes throughput connector 115a for providing an additional receptacle with coupling to the computer system. It should be appreciated that I/O connectors 110a and 110b and throughput connectors 115a, 115b and 215 can be any type of connector and are not limited to those shown in FIG. 3, which for purposes of brevity and clarity are shown as male/female type connectors.

In one embodiment, base unit 210 is configured to receive a power signal from the computer system, and thus to provide power to connected receptacles 100a and 100b. In another embodiment, base unit 210 includes a separate power connection to a power supply over power cable 220 for providing power to connected receptacles 100a and 100b. It should be appreciated that power is provided to receptacles 100a and 100b regardless of whether power is received at base unit 210 from a computer system over cable 220 or from an external power supply over power cable 222.

Figure 4A:
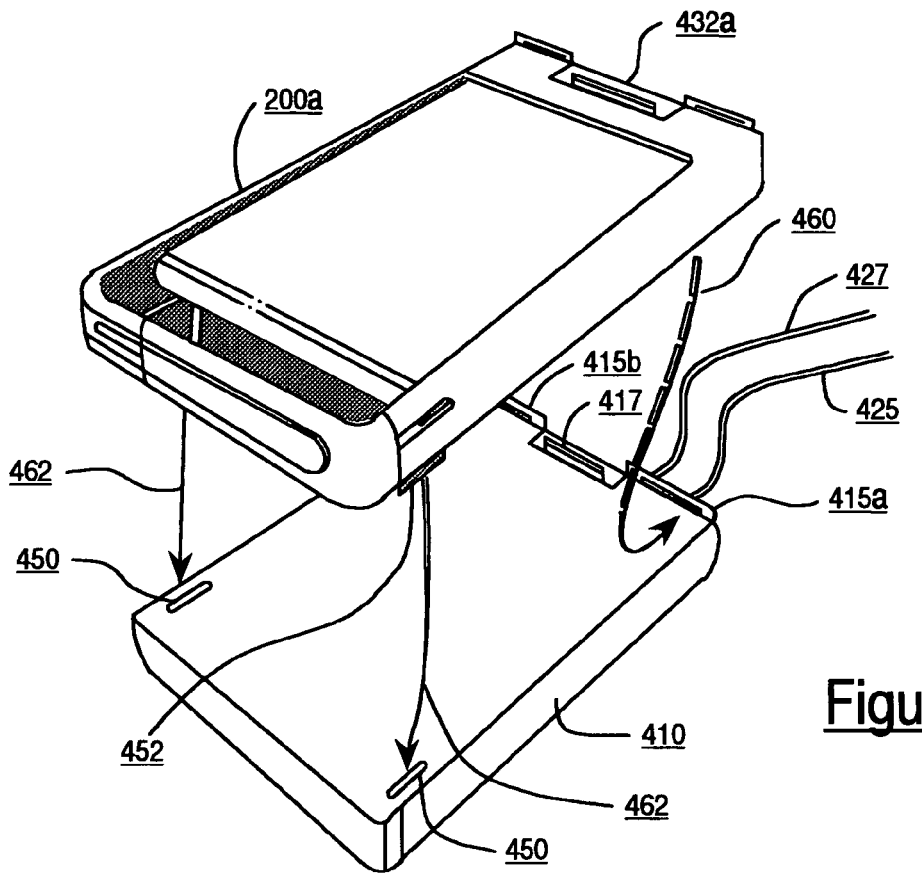
FIG. 4A is a perspective diagram of an exemplary modularly expandable data storage device receptacle and a base unit, in accordance with an embodiment of the present invention.

FIG. 4A is a perspective diagram of an exemplary modularly expandable data storage device receptacle 200a and a base unit 410, in accordance with an embodiment of the present invention. Base unit 410 includes throughput connector 417, connection mechanisms 415a and 415b, and alignment features 450. Base unit 410 is coupled to a computer system over data cable 425 and is coupled to a power supply over power cable 427. Throughput connector 417 is coupled to both data cable 425 and power cable 427. In one embodiment, throughput connector 417 includes a plurality of pins, wherein a first subset of the pins is coupled to data cable 425 for transmitting data to and from the computer system and a second subset of the pins is coupled to power cable 427 for transmitting power from the power supply. In one embodiment, base unit 410 also includes grooves 450 for providing alignment with features of receptacle 200a.

Receptacle 200a includes an I/O connector and connection means on the bottom surface (not shown) and throughput connector 432a. In one embodiment, receptacle 200a includes alignment features 452 for alignment with grooves 450. Arrow 460 indicates the motion associated with connecting the connection means of receptacle 200a with connection means 415a and 415b. Once the connection means of receptacle 200a are connected with connection means 415a and 415b, alignment features 452 are connected with grooves 450, as indicated by arrows 462. Connecting receptacle 200a with base unit 410 according to the movements indicated by arrows 460 and 462 ensures that throughput connector 417 is properly aligned for coupling with the I/O connector of receptacle 200a.

Figure 4B:
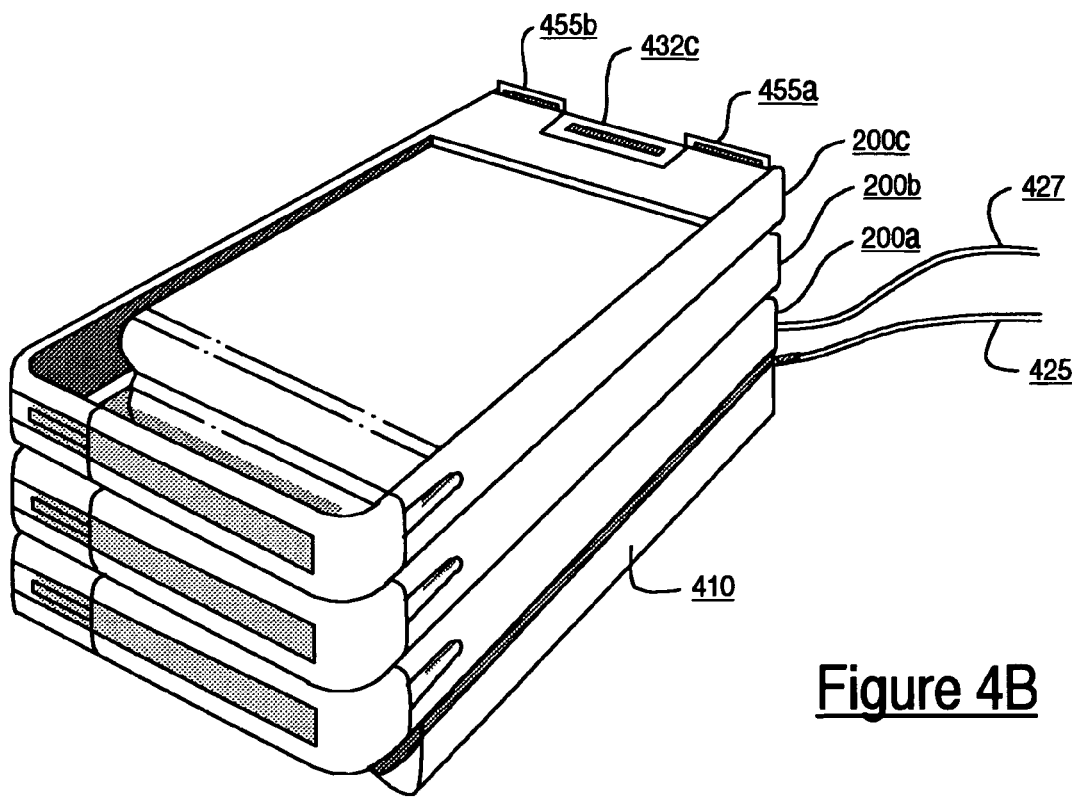
FIG. 4B is a perspective diagram of a plurality of exemplary modularly expandable data storage device receptacles connected in series to a base unit, in accordance with an embodiment of the present invention.

FIG. 4B is a perspective diagram of a plurality of exemplary modularly expandable data storage device receptacles 200a-200c connected in series to a base unit 410, in accordance with an embodiment of the present invention. By stacking receptacle 200b onto receptacle 200a, thereby coupling the throughput connector of receptacle of 200a with the I/O connector of receptacle 200b, receptacle 200b is coupled to data cable 425 and power cable 427. Similarly, by stacking receptacle 200c onto receptacle 200b, thereby coupling the throughput connector of receptacle of 200b with the I/O connector of receptacle 200c, receptacle 200c is coupled to data cable 425 and power cable 427. Moreover, receptacle 200c is configured for connection to an additional receptacle using connection means 455a and 455b such that throughput connector 432c can be coupled to an I/O connector of the additional receptacle.

FIG. 5 is a schematic diagram illustrating a plurality of modularly expandable data storage device receptacles 150a-150c coupled to a computer system through modularly expandable data storage device receptacle 150a, in accordance with an embodiment of the present invention. Receptacle 150a is configured for communicative coupling to a computer system and over cable I/O connector 162a. Receptacle 150a is coupled to the computer system over cable 512 and includes throughput connector 115c. In one embodiment, receptacle 150a also includes appendage 525a for ensuring that receptacle 150a is level with respect to the surface one which it resides. In one embodiment, I/O connector 110c is configured for receiving closure 535. Closure 535 provides protection to I/O connector 110c, which is not electrically coupled to another device, and also is for ensuring that receptacle 150a is level with respect to the surface one which it resides.

In one embodiment, receptacle 150a is configured to receive a power signal from the computer system at cable I/O connector 162a, and thus to provide power to connected receptacles 150b and 150c. In another embodiment, receptacle 150a includes a separate power connector 170a for coupling to a power supply over power cable 522 for providing power to connected receptacles 150b and 150c. It should be appreciated that power is provided to receptacles 150b and 150c regardless of whether power is received at receptacle 150a from a computer system at cable I/O connector 162a or from an external power supply at power connector 170a.

Receptacle 150b connects to receptacle 150a such that I/O connector 110d is coupled to throughput connector 115c. In one embodiment, receptacle 150b also includes appendage 525b for ensuring that receptacle 150b has a level connection with respect to receptacle 150a. In one embodiment, appendage 525b is an alignment feature that aligns with a groove on the surface of receptacle 150a for ensuring that throughput connector 115c aligns properly with I/O connector 110d. In one embodiment, receptacle 150b includes cable I/O connector 162b and power connector 170b, neither of which are connected to another device or power supply, respectively.

Similarly, receptacle 150b is configured for connection to receptacle 150c for providing receptacle 150c with coupling to the computer system. Receptacle 150c connects to receptacle 150b such that I/O connector 110e is coupled to throughput connector 115d. In one embodiment, receptacle 150c also includes appendage 525c for ensuring that receptacle 150c has a level connection with respect to receptacle 150b. In one embodiment, appendage 525c is an alignment feature that aligns with a groove on the surface of receptacle 150b for ensuring that throughput connector 115d aligns properly with I/O connector 110e. In one embodiment, receptacle 150c includes cable I/O connector 162c and power connector 170c, neither of which are connected to another device or power supply, respectively. Receptacle 150c also includes throughput connector 115e for providing an additional receptacle with coupling to the computer system. It should be appreciated that I/O connectors 110c, 110d and 110e and throughput connectors 115c, 115d and 115e can be any type of connector and are not limited to those shown in FIG. 5, which for purposes of brevity and clarity are shown as male/female type connectors.

FIG. 6 is a flow chart illustrating a process 600 for accessing a modularly expandable data storage device, in accordance with an embodiment of the present invention. In one embodiment, process 600 is carried out by processors and electrical components (e.g., a computer system) controlling the operation of an external memory device (e.g., memory device 210 of FIG. 2) within a modularly expandable data storage receptacle, and under the control of computer readable and computer executable instructions. Although specific steps are disclosed in process 600, such steps are exemplary. That is, the embodiments of the present invention are well suited to performing various other steps or variations of the steps recited in FIG. 6. For purposes of brevity and clarity, process 600 is described with reference to the elements of FIG. 5. Specifically, process 600 is described from the perspective of receptacle 150b of FIG. 5.

At step 610 of process 600, a communication associated with a memory device of a first modularly expandable data storage device receptacle (e.g., receptacle 150b) is received. The communication is initiated at a computer system, wherein the first modularly expandable data storage device receptacle is communicatively coupled to the computer system through a second modularly expandable data storage device receptacle (e.g., receptacle 150a), wherein a throughput connector (e.g., throughput connector 115c) of the second modularly expandable data storage device receptacle is communicatively coupled to an I/O connector (e.g., I/O connector 110d) of the first modularly expandable data storage device receptacle. In one embodiment, the communication comprises a data access request for accessing data stored on the memory device.

At step 620, responsive to the communication, a second communication is transmitted to the computer system, the second communication passing through the second modularly expandable data storage device receptacle. In one embodiment, the second communication comprises requested data such that the requested data passes through the second modularly expandable data storage device receptacle in transmission to the computer system.

In one embodiment, as shown at step 630, a power signal is received from a power supply, wherein the first modularly expandable data storage device receptacle is electrically coupled to the power supply through the second modularly expandable data storage device receptacle.

In one embodiment, as shown at step 640, a second communication associated with a third modularly expandable data storage device receptacle (e.g., receptacle 150c) is received. The second communication is initiated at a computer system, wherein the first modularly expandable data storage device receptacle is communicatively coupled to the third modularly expandable data storage device receptacle such that the third modularly expandable data storage device receptacle is communicatively coupled to the computer system through the first modularly expandable data storage device receptacle and the second modularly expandable data storage device receptacle. At step 650, the second communication is throughput to the third modularly expandable data storage device receptacle.

Figure 7:
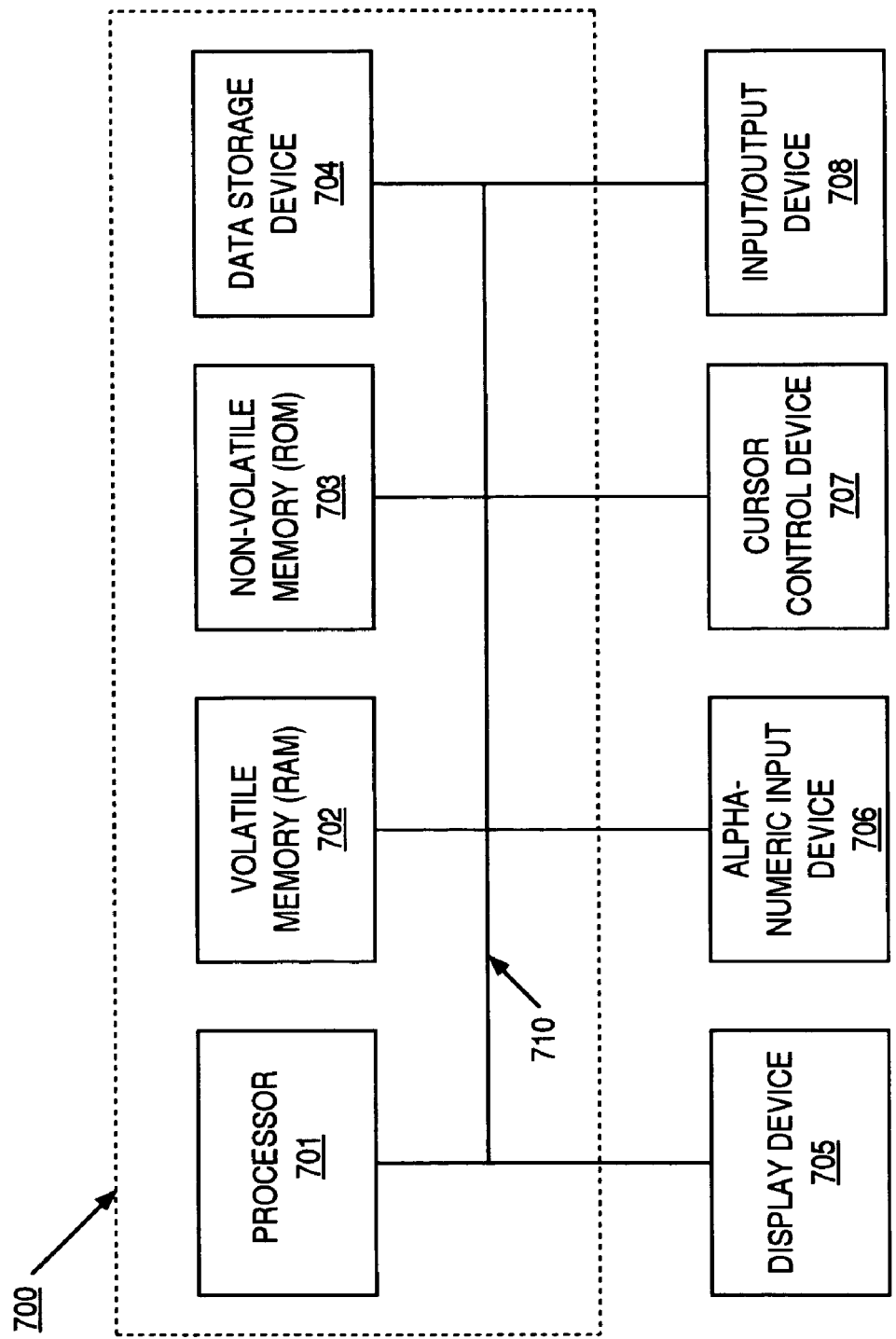
FIG. 7 is a block diagram of electronic components of an exemplary computer system platform, in accordance with an embodiment of the present invention.

As described above, the modularly expandable data storage device receptacle as described is configured couple a memory device to a computer system. FIG. 7 is a block diagram of electronic components of an exemplary computer system 700, in accordance with an embodiment of the present invention. In general, computer system 700 includes bus 710 for communicating information, processor 701 coupled with bus 710 for processing information and instructions, random access (volatile) memory (RAM) 702 coupled with bus 710 for storing information and instructions for processor 701, read-only (non-volatile) memory (ROM) 703 coupled with bus 710 for storing static information and instructions for processor 701, data storage device 704 such as a magnetic or optical disk and disk drive coupled with bus 710 for storing information and instructions.

In one embodiment, computer system 700 comprises an optional user output device such as display device 705 coupled to bus 710 for displaying information to the computer user, an optional user input device such as alphanumeric input device 706 including alphanumeric and function keys coupled to bus 710 for communicating information and command selections to processor 701, and an optional user input device such as cursor control device 707 coupled to bus 710 for communicating user input information and command selections to processor 701. Furthermore, an I/O device 708 is used to couple computer system 700, for example, a memory unit of a modularly expandable data storage device receptacle.

In summary, in its various embodiments, the present invention provides for the modular expansion of data storage capacity of computer system. The modularly expandable data storage device receptacles of the present invention can be coupled together without the use of external cabling. In other words, the connectors of adjacent receptacles can be directly coupled together. The receptacles are coupled to the computer system over a single connection, either by a cable connected to one of the receptacles or through a base unit connected to one of the receptacles. The present invention provides an easy solution for expanding the data storage capacity of a computer system that a typical user would feel confident utilizing. Moreover, since only one connection is required between the computer system and the receptacles, the complexity of adding data storage capacity is reduced for the typical user.

Various embodiments of the present invention, a modularly expandable data storage device receptacle, are described herein. While the present invention has been described in particular embodiments, it should be appreciated that the present invention should not be construed as limited by such embodiments, but rather construed according to the following claims.

What is claimed is:

1. A modularly expandable data storage device receptacle comprising:
    a housing configured to receive a memory device for providing additional data storage for a computer system, said housing external to said computer system and configured as a base for the memory device, the base configured to connect to a first cable for power and a first connector, the first connector for receiving data signals from said computer system on a second cable for accessing said memory device; and
    a second connector for passing data signals from said computer system to a connector of another modularly expandable data storage device receptacle.

2. The modularly expandable data storage device receptacle of claim 1, further comprising a data cable connector for coupling to a data cable coupled to said computer system for transmitting data between said memory device and said computer system.

3. The modularly expandable data storage device receptacle of claim 1, further comprising a power connector for receiving a power signal for providing power to said memory device.

4. The modularly expandable data storage device receptacle of claim 1, wherein said first connector is for coupling to a throughout connector of another modularly expandable data storage device receptacle for receiving said data signals.

5. The modularly expandable data storage device receptacle of claim 4, wherein said first connector is also for receiving a power signal from said throughput connector from providing power to said memory device.

6. The modularly expandable data storage device receptacle of claim 1, wherein said first connector is for coupling to a base throughput connector of a base station, said base station coupled to said computer system and a power supply such that said first connector is for receiving data signals that are transmitted from said computer system and for receiving a power signal transmitted from said power source.

7. The modularly expandable data storage device receptacle of claim 1, wherein said memory device is a hard disk drive.

8. The modularly expandable data storage device receptacle of claim 1, wherein said housing comprising at least one alignment feature for aligning said second connector with said connector of another modularly expandable data storage device receptacle.

9. An external data storage device receptacle for use with a computer system, said external data storage device receptacle comprising:
    a housing-configured to receive a memory device, wherein said housing is external to said computer system and is also configured for connecting to a second housing of a second external data storage device receptacle and configured as a base for the memory device, the base comprising a connector for a first cable for power and an input/output connector, the input/output connector for receiving data signals over a second cable, the signals originating from said computer system for accessing said memory device; and
    a throughput connector for connecting to a second input/output connector of said second external data storage device receptacle such that said throughput connector is for passing data signals originating from said computer system to said second external data storage device receptacle.

10. The externals data storage device receptacle of claim 9, further comprising a cable input/output connector coupled to a data cable, said data cable coupled to said computer system for transmitting data between said memory device and said computer system.

11. The external data storage device receptacle of claim 9, further comprising a power connector for receiving a power signal for providing power to said memory device.

12. The external data storage device receptacle of claim 9, wherein said input/output connector is for coupling to a third throughput connector of a third external data storage device receptacle such that said input/output connector is for receiving data signals that are transmitted from said computer system and pass through said third external data storage device receptacle.

13. The external data storage device receptacle of claim 12, wherein said input/output connector is also for receiving a power signal for providing power to said memory device, said power signal transmitted from a power source and passing through said third external data storage device receptacle.

14. The external data storage device receptacle of claim 9, wherein said input/output connector is for coupling to a base throughput connector of a base station such that said input/output connector is for receiving data signals that are transmitted from said computer system and pass through said base station and for receiving power signal transmitted from a power source and passing through said base station.

15. The external data storage device receptacle of claim 9, wherein said memory device is a hard disk drive.

16. The external data storage device receptacle of claim 9, wherein a first surface of said housing comprises at least one alignment feature for aligning said throughput connector with said second input/output connector of said second external data storage device receptacle.

17. A method for accessing a modularly expandable data storage device receptacle, said method comprising:
    receiving a communication associated with a memory device of said first modularly expandable data storage device receptacle, said communication initiated at a computer system, wherein said first modularly expandable data storage device receptacle is communicatively coupled to said computer system through a second modularly expandable data storage device receptacle, wherein a throughput connector of said second modularly expandable data storage device receptacle is communicatively coupled to an input/output connector of said first modularly expandable data storage device receptacle the second modularly expandable data storage device receptacle configured as a base for the first modularly expandable storage device receptacle, the second modularly expandable data storage device receptacle comprising a connector for a first cable for power and an input/output connector for a second cable; and
    responsive to said communication, transmitting a second communication to said computer system, said second communication passing through said second modularly expandable data storage device receptacle.

18. The method as recited in claim 17, wherein said communication comprises a data access request for accessing data stored on said memory device and said second communication comprising requested data such that said requested data passes through said second modularly expandable data storage device receptacle in transmission to said computer system.

19. The method as recited in claim 17, further comprising receiving a power signal from a power supply, wherein said first modularly expandable data storage device receptacle is electrically coupled to said power supply through said second modularly expandable data storage device receptacle.

20. The method as recited in claim 17, further comprising:

receiving a second communication associated with a third modularly expandable data storage device receptacle, said second communication initiated at a computer system, wherein said first modularly expandable data storage device receptacle is communicatively coupled to said third modularly expandable data storage device receptacle such that said third modularly expandable data storage device receptacle is communicatively coupled to said computer system through said first modularly expandable data storage device receptacle and said second modularly expandable data storage device receptacle; and through putting said second communication to said third modularly expandable data storage device receptacle.

* * * * *

UNITED STATES PATENT AND TRADEMARK OFFICE
CERTIFICATE OF CORRECTION

PATENT NO. : 7,474,517 B2
APPLICATION NO. : 11/261257
DATED : January 6, 2009
INVENTOR(S) : David N. Skinner et al.

Page 1 of 1

It is certified that error appears in the above-identified patent and that said Letters Patent is hereby corrected as shown below:

In column 4, line 13, delete "1/0" and insert -- I/O --, therefor.

In column 9, line 26, in Claim 4, delete "throughout" and insert -- throughput --, therefor.

In column 9, line 30, in Claim 5, delete "from" and insert -- for --, therefor.

In column 9, line 43, in Claim 8, delete "comprising" and insert -- comprises --, therefor.

In column 9, line 66, in Claim 10, delete "externals" and insert -- external --, therefor.

In column 10, line 24, in Claim 14, insert -- a -- before "power".

In column 10, line 59, in Claim 18, delete "comprising" and insert -- comprises --, therefor.

In column 12, line 6, in Claim 20, delete "through putting" and insert -- throughputting --, therefor.

Signed and Sealed this

Fifth Day of May, 2009

JOHN DOLL
*Acting Director of the United States Patent and Trademark Office*